United States Patent
Lyman (10) Patent No.: US 9,395,873 B2
(45) Date of Patent: *Jul. 19, 2016

(54) SYSTEM AND METHOD FOR PROVIDING SINGLE CLICK ENTERPRISE COMMUNICATION

(71) Applicant: Christopher M. Lyman, Los Angeles, CA (US)

(72) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/909,064

(22) Filed: Jun. 3, 2013

(65) Prior Publication Data
US 2013/0268866 A1    Oct. 10, 2013

Related U.S. Application Data

(63) Continuation of application No. 12/075,401, filed on Mar. 10, 2008, now Pat. No. 8,499,246.

(60) Provisional application No. 60/906,024, filed on Mar. 9, 2007.

(51) Int. Cl.
| | |
|---|---|
| *G06F 3/00* | (2006.01) |
| *G06F 3/0481* | (2013.01) |
| *H04L 12/58* | (2006.01) |
| *H04M 7/00* | (2006.01) |
| *H04M 3/436* | (2006.01) |
| *G06F 9/54* | (2006.01) |
| *H04M 3/42* | (2006.01) |

(52) U.S. Cl.
CPC .............. *G06F 3/0481* (2013.01); *G06F 9/542* (2013.01); *H04L 12/581* (2013.01); *H04L 51/04* (2013.01); *H04M 3/42365* (2013.01); *H04M 3/4365* (2013.01); *H04M 7/0045* (2013.01); *H04M 3/42314* (2013.01)

(58) Field of Classification Search
CPC .................................................. H04M 3/42365
See application file for complete search history.

(56) References Cited

U.S. PATENT DOCUMENTS

| | | | |
|---|---|---|---|
| 4,653,090 | A | 3/1987 | Hayden |
| 5,533,110 | A | 7/1996 | Pinard et al. |

(Continued)

FOREIGN PATENT DOCUMENTS

| | | |
|---|---|---|
| WO | WO2004049121 | 6/2004 |
| WO | WO2005036330 | 4/2005 |
| WO | WO2006020168 | 2/2006 |

OTHER PUBLICATIONS

Final Office Action, Jul. 23, 2013, U.S. Appl. No. 11/827,314, filed Jul. 11, 2007.

(Continued)

*Primary Examiner* — Omar Abdul-Ali
(74) *Attorney, Agent, or Firm* — Carr & Ferrell LLP (57) ABSTRACT

Systems and methods for providing single click enterprise communication are provided. In exemplary embodiments, a profile is associated with each individual of an enterprise. A single click selection of a communication type from a plurality of communication types for a particular individual may then be received. The profile associated with the individual is then reviewed to determine one or more contact identifiers associated with the selected communication type. Using the determined contact identifiers a communication may be established with the individual.

20 Claims, 7 Drawing Sheets

(56) References Cited

U.S. PATENT DOCUMENTS

| | | |
|---|---|---|
| 5,703,943 A | 12/1997 | Otto |
| 5,754,636 A | 5/1998 | Bayless et al. |
| 5,854,834 A | 12/1998 | Gottlieb et al. |
| 5,940,488 A | 8/1999 | DeGrazia et al. |
| 6,067,525 A | 5/2000 | Johnson et al. |
| 6,104,711 A | 8/2000 | Voit |
| 6,137,869 A | 10/2000 | Voit et al. |
| 6,282,574 B1 | 8/2001 | Voit |
| 6,359,880 B1 | 3/2002 | Curry et al. |
| 6,389,132 B1 | 5/2002 | Price |
| 6,400,719 B1 | 6/2002 | Chimura et al. |
| 6,418,214 B1 | 7/2002 | Smythe et al. |
| 6,430,275 B1 | 8/2002 | Voit et al. |
| 6,430,289 B1 | 8/2002 | Liffick |
| 6,453,038 B1 | 9/2002 | McFarlane et al. |
| 6,628,765 B1 | 9/2003 | Bangs et al. |
| 6,718,030 B1 | 4/2004 | Turner et al. |
| 6,782,412 B2 | 8/2004 | Brophy et al. |
| 6,820,083 B1 | 11/2004 | Nagy et al. |
| 6,937,703 B1 | 8/2005 | Andreason |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,231,229 B1 * | 6/2007 | Hawkins ......... H04M 1/274558 345/1.1 |
| 7,274,781 B2 | 9/2007 | Lipton et al. |
| 7,333,976 B1 | 2/2008 | Auerbach et al. |
| 7,441,002 B1 | 10/2008 | Catchpole et al. |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,606,221 B2 | 10/2009 | Artru et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 | 4/2010 | Shaffer et al. |
| 7,711,104 B1 | 5/2010 | Flockhart et al. |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,098,810 B2 | 1/2012 | Lyman |
| 8,131,872 B2 | 3/2012 | Kennedy et al. |
| 8,132,001 B1 | 3/2012 | Patten et al. |
| 8,214,265 B2 | 7/2012 | Peters |
| 8,223,941 B2 | 7/2012 | White et al. |
| 8,341,535 B2 | 12/2012 | Lyman |
| 8,379,832 B1 | 2/2013 | Lyman |
| 8,495,653 B2 | 7/2013 | Lyman |
| 8,499,246 B2 | 7/2013 | Lyman |
| 8,571,202 B2 | 10/2013 | Lyman |
| 8,693,659 B2 | 4/2014 | Lyman |
| 8,719,386 B2 | 5/2014 | Lyman et al. |
| 8,780,925 B2 | 7/2014 | Otto et al. |
| 8,787,548 B2 | 7/2014 | Lyman |
| 8,832,717 B2 | 9/2014 | Lyman |
| 8,976,952 B2 | 3/2015 | Lyman |
| 9,001,993 B2 | 4/2015 | Lyman |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0064149 A1 | 5/2002 | Elliott et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0112941 A1 | 6/2003 | Brown et al. |
| 2003/0219029 A1 | 11/2003 | Pickett |
| 2003/0228010 A1 | 12/2003 | Clarisse et al. |
| 2004/0001573 A1 | 1/2004 | Gusler et al. |
| 2004/0039889 A1 | 2/2004 | Elder et al. |
| 2004/0042444 A1 | 3/2004 | Edmon et al. |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179515 A1 | 9/2004 | Kamani et al. |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gusler et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0111440 A1 | 5/2005 | Artru et al. |
| 2005/0135593 A1 | 6/2005 | Becerra et al. |
| 2005/0152371 A1 | 7/2005 | Chen et al. |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0100923 A1 | 5/2006 | Courchesne |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0140452 A1 | 6/2006 | Raynor et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song et al. |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto et al. |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0041527 A1 | 2/2007 | Tuchman et al. |
| 2007/0061197 A1 | 3/2007 | Ramer et al. |
| 2007/0064913 A1 | 3/2007 | Shaffer et al. |
| 2007/0078708 A1 | 4/2007 | Yu et al. |
| 2007/0121896 A1 | 5/2007 | Patakula et al. |
| 2007/0153747 A1 | 7/2007 | Pan et al. |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |

(56) References Cited

U.S. PATENT DOCUMENTS

| | | | |
|---|---|---|---|
| 2008/0025316 A1 | 1/2008 | Zampiello et al. |
| 2008/0031228 A1 | 2/2008 | Gallant |
| 2008/0095355 A1 | 4/2008 | Mahalaha et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2009/0275314 A1 | 11/2009 | Cotevino et al. |
| 2010/0174807 A1 | 7/2010 | Lyman et al. |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2011/0306298 A1 | 12/2011 | Lyman |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins et al. |
| 2013/0268948 A1 | 10/2013 | Lyman |
| 2014/0029745 A1 | 1/2014 | Lyman |

OTHER PUBLICATIONS

Non-Final Office Action, May 24, 2013, U.S. Appl. No. 13/213,020, filed Aug. 18, 2011.
Non-Final Office Action, May 7, 2013, U.S. Appl. No. 13/738,841, filed Jan. 10, 2013.
Final Office Action, Aug. 13, 2013, U.S. Appl. No. 11/506,279, filed Aug. 17, 2006.
Advisory Action, Oct. 4, 2013, U.S. Appl. No. 11/827,314, filed Jul. 11, 2007.
Final Office Action, Oct. 8, 2013, U.S. Appl. No. 12/228,301, filed Aug. 11, 2008.
Final Office Action, Oct. 7, 2013, U.S. Appl. No. 12/319,693, filed Jan. 8, 2009.
Non-Final Office Action, Sep. 5, 2013, U.S. Appl. No. 12/405,197, filed Mar. 16, 2009.
Final Office Action, Oct. 31, 2013, U.S. Appl. No. 12/405,204, filed Mar. 16, 2009.
Notice of Allowance, Aug. 15, 2013, U.S. Appl. No. 13/738,841, filed Jan. 10, 2013.
Notice of Allowance, Nov. 27, 2013, U.S. Appl. No. 11/827,314, filed Jul. 11, 2007.
Final Office Action, Nov. 22, 2013, U.S. Appl. No. 12/288,301, filed Aug. 11, 2008.
Advisory Action, Jan. 29, 2014, U.S. Appl. No. 12/228,301, filed Aug. 11, 2008.
Notice of Allowance, Jan. 7, 2014, U.S. Appl. No. 12/319,693, filed Jan. 8, 2009.
Non-Final Office Action, Dec. 9, 2013, U.S. Appl. No. 13/213,020, filed Aug. 18, 2011.
Non-Final Office Action, Dec. 18, 2013, U.S. Appl. No. 13/601,965, filed Aug. 31, 2012.
Non-Final Office Action, Jan. 14, 2014, U.S. Appl. No. 13/908,974, filed Jun. 3, 2013.
Non-Final Office Action, Nov. 25, 2013, U.S. Appl. No. 14/036,977, filed Sep. 25, 2013.
Non-Final Office Action, Feb. 12, 2014, U.S. Appl. No. 12/405,197, filed Mar. 16, 2009.
Notice of Allowance, Feb. 14, 2014, U.S. Appl. No. 11/506,279, filed Aug. 17, 2006.
Non-Final Office Action, Feb. 25, 2014, U.S. Appl. No. 12/405,204, filed Mar. 16, 2009.
Non-Final Office Action, Mar. 20, 2014, U.S. Appl. No. 13/213,020, filed Aug. 18, 2011.
Notice of Allowance, Apr. 10, 2014, U.S. Appl. No. 13/601,965, filed Aug. 31, 2012.
Final Office Action, Jul. 1, 2014, U.S. Appl. No. 13/213,020, filed Aug. 18, 2011.
Notice of Allowance, Jun. 19, 2014, U.S. Appl. No. 13/908,974, filed Jun. 3, 2013.
Final Office Action, Jun. 6, 2014, U.S. Appl. No. 14/036,977, filed Sep. 25, 2013.
Non-Final Office Action, Sep. 16, 2014, U.S. Appl. No. 12/228,301, filed Aug. 11, 2008.
Non-Final Office Action, Oct. 27, 2014, U.S. Appl. No. 12/405,197, filed Mar. 16, 2009.
Final Office Action, Aug. 14, 2014, U.S. Appl. No. 12/405,204, filed Mar. 16, 2009.
Advisory Action, Nov. 7, 2014, U.S. Appl. No. 12/405,204, filed Mar. 16, 2009.
Final Office Action, Aug. 25, 2014, U.S. Appl. No. 13/213,020, filed Aug. 18, 2011.
Advisory Action, Oct. 14, 2014, U.S. Appl. No. 13/213,020, filed Aug. 18, 2011.
Notice of Allowance, Nov. 4, 2014, U.S. Appl. No. 13/213,020, filed Aug. 18, 2011.
Advisory Action, Aug. 8, 2014, U.S. Appl. No. 14/036,977, filed Sep. 25, 2013.
Non-Final Office Action, Sep. 12, 2014, U.S. Appl. No. 14/036,977, filed Sep. 25, 2013.
Non-Final Office Action, Nov. 29, 2010, U.S. Appl. No. 11/506,279, filed Aug. 17, 2006.
Non-Final Office Action, Jul. 19, 2011, U.S. Appl. No. 11/506,279, filed Aug. 17, 2006.
Final Office Action, Jan. 26, 2012, U.S. Appl. No. 11/506,279, filed Aug. 17, 2006.
Non-Final Office Action, Mar. 13, 2013, U.S. Appl. No. 11/506,279, filed Aug. 17, 2006.
Non-Final Office Action, May 12, 2011, U.S. Appl. No. 12/069,083, filed Feb. 6, 2008.
Notice of Allowance, Sep. 2, 2011, U.S. Appl. No. 12/069,083, filed Feb. 6, 2008.
Non-Final Office Action, Mar. 2, 2011, U.S. Appl. No. 11/800,302, filed May 3, 2007.
Final Office Action, Oct. 18, 2011, U.S. Appl. No. 11/800,302, filed May 3, 2007.
Non-Final Office Action, May 22, 2012, U.S. Appl. No. 11/800,302, filed May 3, 2007.
Notice of Allowance, Dec. 10, 2012, U.S. Appl. No. 11/800,302, filed May 3, 2007.
Non-Final Office Action, Nov. 9, 2011, U.S. Appl. No. 11/827,314, filed Jul. 11, 2007.
Final Office Action, Jul. 19, 2012, U.S. Appl. No. 11/827,314, filed Jul. 11, 2007.
Non-Final Office Action, Jan. 29, 2013, U.S. Appl. No. 11/827,314, filed Jul. 11, 2007.
Non-Final Office Action, Dec. 22, 2010, U.S. Appl. No. 12/075,411, filed Mar. 10, 2008.
Final Office Action, Aug. 8, 2011, U.S. Appl. No. 12/075,411, filed Mar. 10, 2008.

(56) References Cited

OTHER PUBLICATIONS

Notice of Allowance, Jun. 13, 2012, U.S. Appl. No. 12/075,411, filed Mar. 10, 2008.
Non-Final Office Action, Jul. 6, 2011, U.S. Appl. No. 12/075,402, filed Mar. 10, 2008.
Non-Final Office Action, Apr. 19, 2012, U.S. Appl. No. 12/075,402, filed Mar. 10, 2008.
Notice of Allowance, Mar. 8, 2013, U.S. Appl. No. 12/075,402, filed Mar. 10, 2008.
Non-Final Office Action, Dec. 8, 2010, U.S. Appl. No. 12/075,401, filed Mar. 10, 2008.
Non-Final Office Action, Jun. 9, 2011, U.S. Appl. No. 12/075,401, filed Mar. 10, 2008.
Final Office Action, Oct. 31, 2011, U.S. Appl. No. 12/075,401, filed Mar. 10, 2008.
Advisory Action, Feb. 15, 2012, U.S. Appl. No. 12/075,401, filed Mar. 10, 2008.
Non-Final Office Action, Jun. 20, 2012, U.S. Appl. No. 12/075,401, filed Mar. 10, 2008.
Notice of Allowance, Mar. 4, 2013, U.S. Appl. No. 12/075,401, filed Mar. 10, 2008.
Non-Final Office Action, Nov. 7, 2011, U.S. Appl. No. 12/228,301, filed Aug. 11, 2008.
Final Office Action, Aug. 30, 2012, U.S. Appl. No. 12/228,301, filed Aug. 11, 2008.
Non-Final Office Action, Apr. 9, 2013, U.S. Appl. No. 12/228,301, filed Aug. 11, 2008.
Non-Final Office Action, Aug. 19, 2010, U.S. Appl. No. 12/319,693, filed Jan. 8, 2009.
Final Office Action, May 3, 2011, U.S. Appl. No. 12/319,693, filed Jan. 8, 2009.
Non-Final Office Action, Oct. 21, 2011, U.S. Appl. No. 12/319,693, filed Jan. 8, 2009.
Final Office Action, May 17, 2012, U.S. Appl. No. 12/319,693, filed Jan. 8, 2009.
Non-Final Office Action, May 21, 2013, U.S. Appl. No. 12/319,693, filed Jan. 8, 2009.
Non-Final Office Action, May 12, 2011, U.S. Appl. No. 12/405,197, filed Mar. 16, 2009.
Final Office Action, Jan. 4, 2012, U.S. Appl. No. 12/405,197, filed Mar. 16, 2009.
Non-Final Office Action, Feb. 1, 2012, U.S. Appl. No. 12/405,204, filed Mar. 16, 2009.
Non-Final Office Action, Dec. 6, 2012, U.S. Appl. No. 12/405,204, filed Mar. 16, 2009.
Parmar, Rashik "Enhanced Enterprise Communication: Transforming the bank into a proactive relationship center." IBM Global Services. May 2004.
Montgomery, Warren & Copeland, Rebecca "Network Intelligence for Presence Enhanced Communication." Nov. 2001. http://tools.ietf.org/id/draft-montgomery-copeland-presence-spirits-00.txt.
Ott, Jorg "Presence Aggregation in Endpoints," Technologiezentrum Informatik, Jan. 2003.
Broder, et al., "Search Advertising Using Web Relevance Feedback", 2008, pp. 1013-1022, Conference on Information and Knowledge Management, Proceeding of the 17th AC conference on Information and Knowledge Management. Yahoo Research. Oct. 2008.
Hull, et al., Enabling Context-Aware and Privacy-Conscious User Data Sharing, 2004, Proceedings of the 2004 IEEE International Conference on Mobile Data Management. Aug. 2004. Accessed Aug. 2011. http://ieeexplore.ieee.org/xpl/freeabs_all.jsp?arnumber=1324414.
Inter-Tel, Inc. "Advanced Applications Design Guide for Contact Center Suite." Issue 1. Apr. 2006.
User Guide, What is Xact View? Xact View User Guide, Schmooze Communications LLC 2008. Accessed Aug. 2011. www.schmoozecom.com. http://literature.schmoozecom.com/XactView/UserGuide/UserGuideXactView.pdf.
Advisory Action, Jul. 14, 2015, U.S. Appl. No. 12/228,301, filed Aug. 11, 2008.
Final Office Action, Oct. 21, 2015, U.S. Appl. No. 12/405,204, filed Mar. 16, 2009.
Advisory Action, Jan. 11, 2016, U.S. Appl. No. 12/405,204, filed Mar. 16, 2009.
Kim, Fryer, ed., "System." Microsoft Press Computer Dictionary, 3rd Ed. Redmond: Microsoft, 1997 pp. 456-457.
Non-Final Office Action, Feb. 17, 2016, U.S. Appl. No. 12/228,301, filed Aug. 11, 2008.
Final Office Action, Apr. 14, 2016, U.S. Appl. No. 12/405,197, filed Mar. 16, 2009.
Notice of Allowance, May 18, 2016, U.S. Appl. No. 12/405,204, filed Mar. 16, 2009.

* cited by examiner

SYSTEM AND METHOD FOR PROVIDING SINGLE CLICK ENTERPRISE COMMUNICATION

CROSS-REFERENCE TO RELATED APPLICATIONS

The present application is a continuation of U.S. patent application Ser. No. 12/075,401, filed Mar. 10, 2008, and entitled "System and Method for Providing Single Click Enterprise Communication," issued as U.S. Pat. No. 8,499, 246 on Jul. 30, 2013, which claims priority benefit of U.S. Provisional Patent Application No. 60/906,024 filed Mar. 9, 2007, and entitled "Real-Time Call Management System," all of which are hereby incorporated by reference.

The present application is also related to U.S. patent application Ser. No. 11/827,314, filed Jul. 11, 2007 and entitled "System and Method for Centralized Presence Management of Local and Remote Users," issued as U.S. Pat. No. 8,693, 659 on Apr. 8, 2014, which is also incorporated by reference.

BACKGROUND OF THE INVENTION

1. Field of the Invention

Embodiments of the present invention relate generally to communication systems and more particularly to providing single click enterprise communication.

2. Description of Related Art

Within an enterprise, users (e.g., employees) often need to communicate with one another. Typically, the user will pick up their phone (e.g., desk phone or cellular phone) and dial a phone number, dial an extension, or select a preprogrammed extension button in order to initiate a phone call. In order to communication with another user via e-mail, the user will typically need to activate their e-mail program and open an e-mail composition window. The user may then be required to enter an e-mail address for the other user. And in cases where the user desires to instant message/chat with another user, the user must activate a chat program and select the other user for chat.

Disadvantageously, each different communication type (e.g., phone call, e-mail, chat) requires activation or access via either a different device or different program. There is no single interface that aggregates a plurality of communication types and allows for activation of a particular communication type via a single user action.

SUMMARY OF THE INVENTION

Embodiments of the present invention provide systems and methods for providing single click communication within an enterprise environment. In exemplary embodiments, a profile is associated with each individual of an enterprise. The profile comprises a listing of one or more communication types that may be used (i.e., are available) to communication with the individual. Additionally, one or more contact identifiers for each available communication type are also provided. The profiles may be stored at a server level and at each client device.

A single click selection of a communication type from a plurality of communication types for a particular individual is then received. In exemplary embodiments, a user interface comprising access to a plurality of communication types is provided from which a single click selection may be performed. The single click selection may comprise selecting an icon on the user interface associated with a particular communication type and the particular individual. The profile associated with the individual is then reviewed to determine one or more contact identifiers associated with the selected communication type. Using the determined contact identifiers a communication may be established with the individual. The communication may be established by the client device or by a server.

DETAILED DESCRIPTION OF EXEMPLARY EMBODIMENTS

Embodiments of the present invention provide systems and methods for providing single click communication within an enterprise. In exemplary embodiments, access to a plurality of communication types for individuals within the enterprise is aggregated and provided via a single user interface. By selecting (e.g., applying a single click to) one of the plurality of communication types for a particular individual, a communication may be established with the particular individual via the selected communication type.

It should be noted that enterprise as applied herein may comprise any type of organization or collection of individuals. Examples of enterprises may include a business, educational institution, firm, or any other type of entity whereby a group of individuals may be centrally organized.

Figure 1:
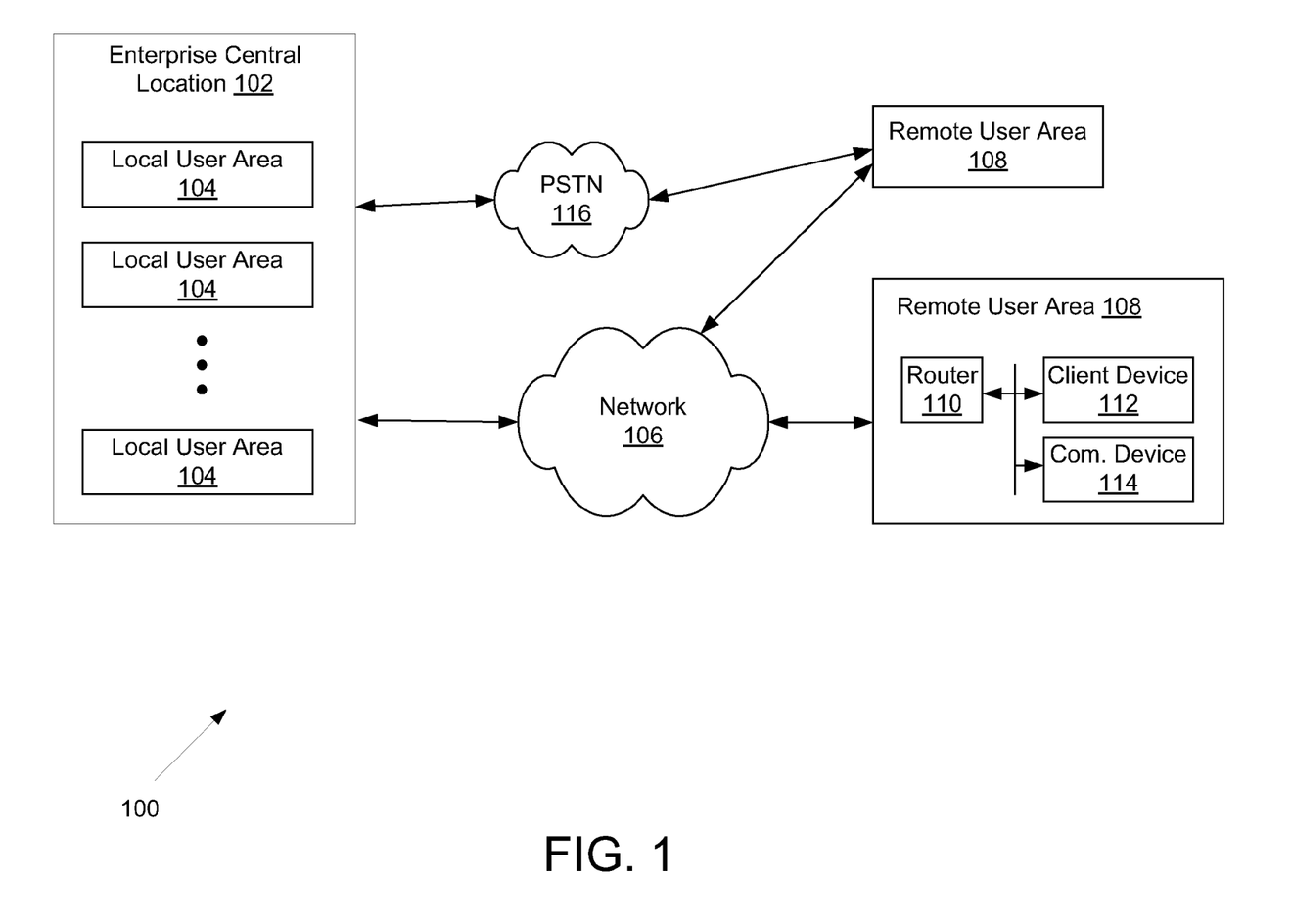
FIG. 1 is a diagram of an exemplary environment in which embodiments of the present invention may be practiced.

FIG. 1 shows an exemplary environment 100 in which embodiments of the present invention may be practiced. The exemplary environment 100 includes an enterprise central location 102 which includes a plurality of local user areas 104. The enterprise central location 102 may be, for example, a main office and the local user areas 104 may include individual offices and/or cubicles. Each local user area 104 may be associated with an individual. It should be noted that any number of local user areas 104 may be provided within the enterprise central location 102. It should also be noted that more than one enterprise central location may be coupled via a network 106 to provide embodiments of the present invention. The enterprise central location will be discussed in more detail in connection with FIG. 2.

The network 106 may comprise the Internet or any other wide area network. In some embodiments, the network 106 may couple the enterprise central location 102 to one or more remote user areas 108 via a router 110 or gateway. The remote user area 108 may be a location associated with an individual that remotely accesses the enterprise central location 102. For example, the remote user area 108 may be a home office of an employee associated with the enterprise central location 102. The remote user area 108 may comprises a remote client device 112 (e.g., a computer), which may function as a communication device. One or more additional communication devices 114 (e.g., analog telephone, VoIP device, cellular phone, laptop) may also be provided in the remote user area 108. Any number of remote user areas 108 may be coupled to the enterprise central location 102. Additionally, it should be noted that "remote" as used herein refers to any environment external to the enterprise central location 102.

According to exemplary embodiments, the users within both the enterprise central location 102 and the remote user areas 108 may communicate with each other via the network 106. For example, the users may e-mail each other or utilize instant messaging which may be forwarded via the network 106. In other embodiments, the users may call each other using any telephony device (e.g., desk phone, VoIP device, cellular phone). In other embodiments, a phone call may be placed by using the network 106 (e.g., VoIP) or placed via a public switch telephone network (PSTN) 116 (e.g., analog phone).

It should be noted that the environment 100 of FIG. 1 is exemplary. Alternative embodiments may comprise any number of enterprise central locations 102, remote user areas 108, client devices 112, and communication devices 114.

Figure 2:
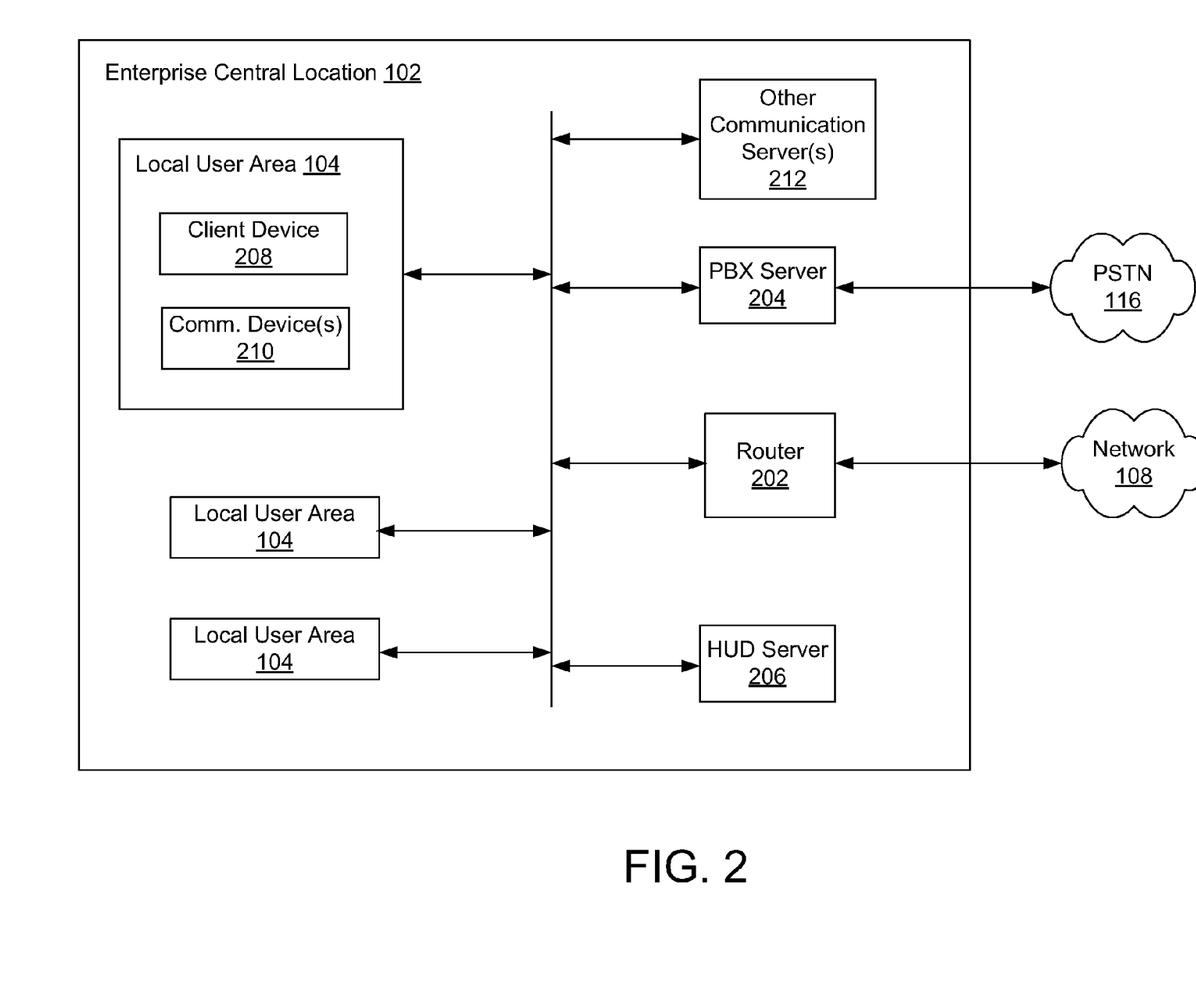
FIG. 2 is a block diagram of an enterprise central location in communication with various networks, according to one embodiment.

Referring now to FIG. 2, the enterprise central location 102 is shown in more detail. The enterprise central location 102 may comprise a plurality of local user areas 104 coupled to a router 202, a PBX server 204, and a heads-up display (HUD) server 206 via a local area network (LAN).

Each local user area 104 may comprise a client device 208. In exemplary embodiments, the client device 208 may comprise a desktop computer, laptop, or any other digital communication device enabled to provide a communications user interface, such as the user interface that will be discussed in connection with FIG. 5. The exemplary client device 208, itself, is configured to be a communication device. As such, the client device 208 may be configured to provide e-mail, instant messaging (e.g., chat), VoIP, or any other communication types. The client device 208 will be discussed in more detail in connection with FIG. 4.

One or more additional communication devices 210 may be provided in the local user area 104. These additional communication devices 210 may comprise a device separate from the client device 208, such as for example, an analog telephone or cellular phone.

In accordance with one embodiment, the enterprise central location 102 is coupled in communication via the router 202 to the network 106 and via the PBX server 204 to the PSTN 116. The PBX server 204 is configured to allow the client device 208 and/or communications devices 210 to make phone calls via the PSTN 116.

The HUD server 206 is configured to manage single click communications at a server level. In exemplary embodiments, the HUD server 206 may maintain and provide user presence status, maintain and provide profile data, and perform communication routing. The HUD server 206 will be discussed in more details in connection with FIG. 3.

One or more other communication servers 212 may also be provided within the enterprise central location 102. These communication servers 212 may establish, maintain, and/or facilitate communications between individuals. The communication servers 212 may include, for example, a chat server, an e-mail server, and so forth. The communication servers 212 may be optional or comprise any number of servers.

Figure 3:
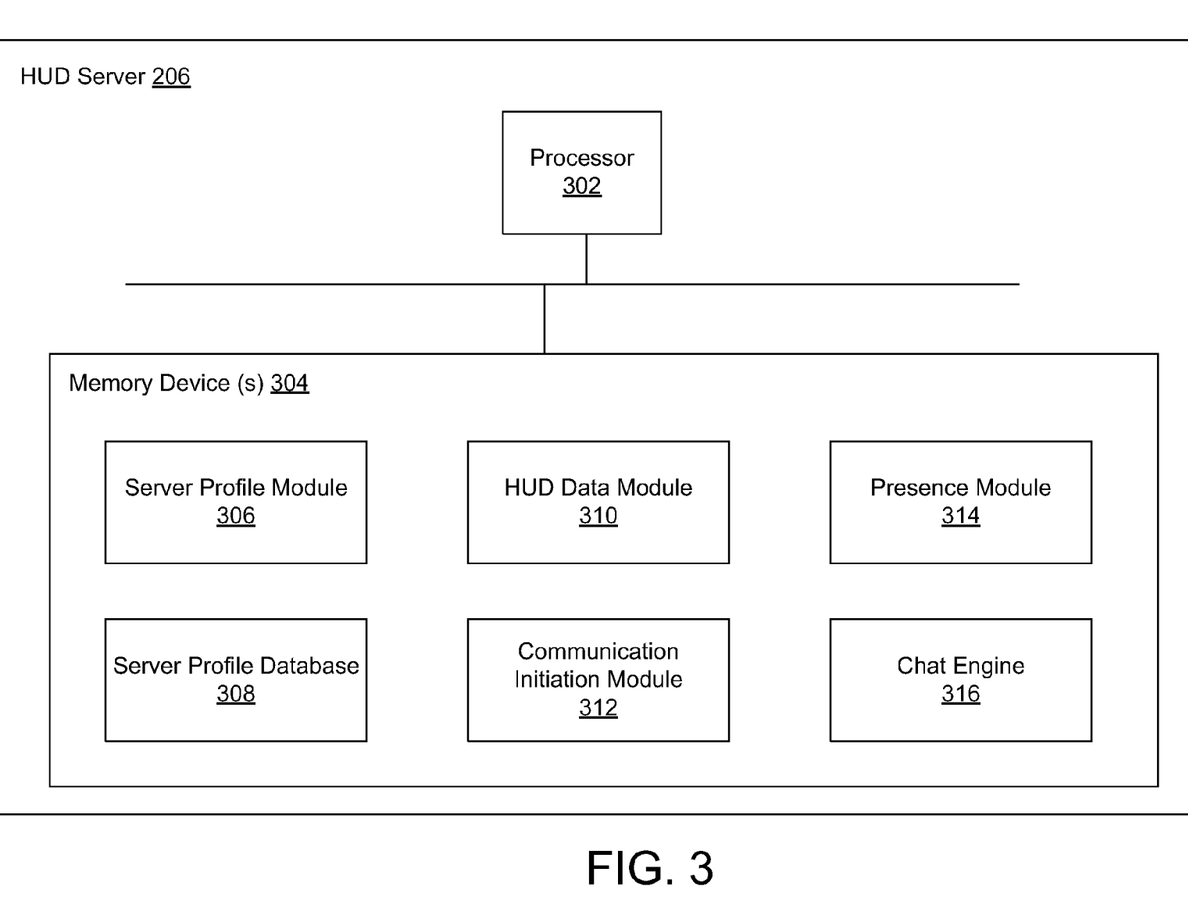
FIG. 3 is a block diagram of an exemplary HUD server.

Referring now to FIG. 3, the exemplary HUD server 206 is shown in more detail. The HUD server 206 comprises a processor 302 and one or more memory devices 304 (also referred to as a storage medium). The memory device(s) 304 may comprise a server profile module 306, a server profile database 308, a HUD data module 310, a communication initiation module 312, and a presence module 314. The HUD server 206 may comprise other components not directly related to functionality of embodiments of the present invention, and thus are not shown or discussed. As such, alternative embodiments of the HUD server 206 may comprise more, less, or functionally equivalent components.

The exemplary server profile module 306 is configured to provide a user interface in which a user or administrator may provide profile data. The profile data may include communication types available for an individual as well as contact identifiers for those communication types. For example, the individual may have a cellular phone (i.e., communication type is call to cellular phone) and the contact identifier will be the phone number of the cellular phone. In some embodiments, the contact identifier may be automatically determined by the server profile module 306. For example, an extension number for an individual within the enterprise may be known and automatically added to the individual's profile. Other forms of contact identifiers may include voicemail numbers, e-mail addresses, and instant message/chat identifiers. It should be noted that any number and forms of communication types and contact identifiers may be associated with each profile.

The profile each individual may be stored in the server profile database 308. In exemplary embodiments, every individual associated with the enterprise that has a client device 112 or 208 and/or a communication device 114 or 210 will have a profile. In some embodiments, the profile may be automatically set up by the server profile module 306 with known profile data, and updated as new data is received by the server profile module 306.

While the server profile module 306 is shown within the HUD server 206, alternative embodiments may provide the server profile module 306 outside of, but coupled to (e.g., via the local area network) the HUD server 206. In some embodiments, the server profile module 306 may comprise a web-based interface. As such, a user or administrator may provide a password to access the server profile module 306 from any location that provides web access. For example, the user may add or update contact identifiers or other profile data from home. The profile data may then be saved to a centralized database. Copies of the profiles may then be sent to the server profile database 308 in the HUD server 206.

In exemplary embodiments, the profiles are broadcast to every client device 112 and 208 associated with the enterprise by the HUD data module 310. The client devices 112 and 208 then locally store the profiles, as will be discussed in connection with FIG. 4. The HUD data module 310 may provide other information stored at the HUD server 206 or passed through the HUD server 206. For example, presence status information for individuals associated with the enterprise may be sent to the client devices 112 and 208.

The exemplary communication initiation module 312 is configured to initiate a communication based on a communication request received from the client device 112 or 208. Once the request is received, the communication initiation module 312 sends instructions to appropriate modules or servers to establish a communication of a selected communication type between two individuals (i.e., the user making the single-click request and the selected individual). For example, the communication initiation module 312 may send instructions to the PBX server 204 to establish a phone call between the two individuals. Alternatively, the communication initiation module 312 may send instructions to a chat server or module to establish a chat communication between the two individuals. In some embodiments, the communication initiation module 312 may initiate a call to the e-mail server to activate an e-mail program.

In some embodiments, the HUD server 206 may include the presence module 314, which is configured to determine and maintain presence status of each individual associated with the enterprise. The presence status may be utilized to determine which individuals are available to receive or establish communications with. In some embodiments, the presence status may be provided to the client devices 112 and 208 by the HUD data module 310. The presence module 314 may be optional in the HUD server 206 in accordance with some embodiments.

In accordance with one embodiment, the HUD server 206 may comprise an optional chat engine 316. In this embodiment, the HUD server 206 provides a client-server module for chatting. The exemplary chat engine 316 is configured to provide chat functionality and determine chat status. Thus, the chat engine 316 controls exchange of chat messages between individuals. In an alternative embodiment, the chat engine 316 may be embodied on a different server or comprise a separate chat server which may be coupled to the HUD server 206.

Figure 4:
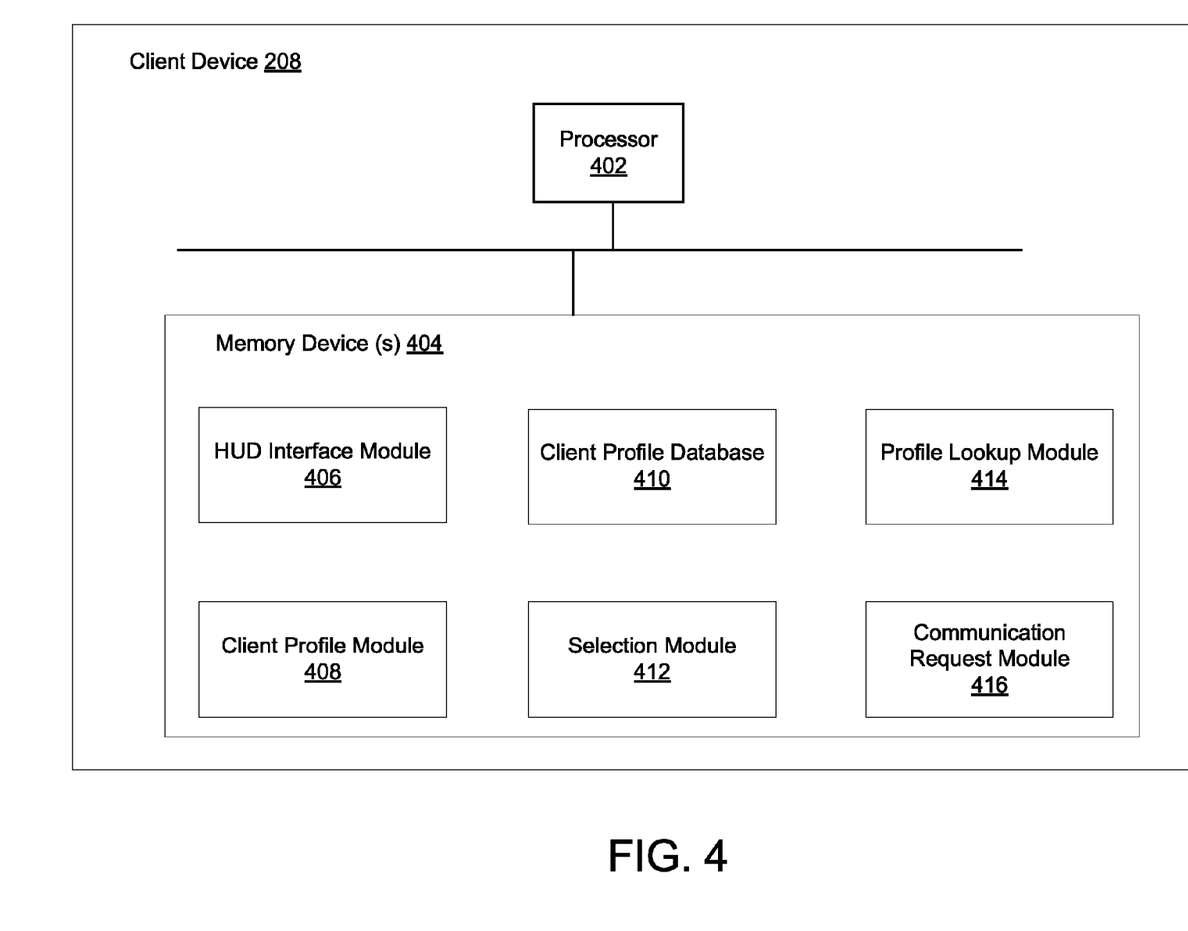
FIG. 4 is a block diagram of an exemplary client device on which embodiments of the present invention may be practiced.

The exemplary client device 208 is shown in FIG. 4. The client device 208 comprises a processor 402 and one or more memory devices 404 (also referred to as a storage medium). The memory device(s) 404 may comprise a HUD interface module 406, a client profile module 408, a client profile database 410, a selection module 412, a profile lookup module 414, and a communication request module 416. The client device 208 may comprise other components not directly related to functionality of embodiments of the present invention, and thus are not shown or discussed. While FIG. 4 discusses the client device 208 of a local user area 104, the client device 112 at the remote user area 108 may comprise similar components and functionalities.

The exemplary HUD interface module 406 is configured to provide a user interface that allows for single click enterprise communication. In exemplary embodiments, the HUD interface module 406 will receive and display data from the HUD server 206 (or other server devices) and from the client device 208. For example, presence status data may be received from the HUD server 206 and displayed in the user interface. An example of the user interface is shown and will be discussed in more detail in connection with FIG. 5.

In exemplary embodiments, the client profile module 408 receives profile data and updates profiles stored locally at the client profile database 410. In some embodiments, the client profile module 408 may receive new and updated profile data from the HUD server 206 periodically. For example, the profile data may be received after a predetermined period of time (e.g., every hour). In other embodiments, the profile data may be received based on an event. For example, the profile data may be received upon startup of the client device 208 or after every instance (or number of instances) of profile changes. The trigger for providing the new/updated profile data may be activated by the HUD server 206 or the client device 208 (e.g., the client device 208 pings the HUD server 206).

The exemplary selection module 412 is configured to process a single click selection and trigger action based on the single click selection. In one embodiment, the selection module 412 will receive the single click selection and instruct the profile lookup module 414 to access the client profile database 410. The profile lookup module 414 then determines the contact identifier(s) associated with the single click selection. Thus, if the single click selection indicates a desire to place a call to Bob Smith, then the contact identifier may comprise a phone number for Bob Smith. In an alternative embodiment, the functionalities of the selection module 412 and the profile lookup module 414 may be combined within a single module.

Once the contact identifier(s) are found by the profile lookup module 414, the communication request module 416 will attempt to initiate the selected communication. In some embodiments, the communication request module 416 will send a communication request comprising the contact identifier to the HUD server 206 or other communication server to initiate the communication. For example, a communication request may be forwarded to the HUD server 206 and the communication initiation module 312 may then instruct the PBX server 204 to establish a phone call. In other embodiments, the communication request module 416 may send instructions to a local module of the client device 208 to initiate the selected communication. For example, the communication request module 416 may instruct an e-mail module of the client device 208 to provide a new e-mail composition window whereby the contact identifier is used to prepopulate an e-mail address field.

Figure 5:
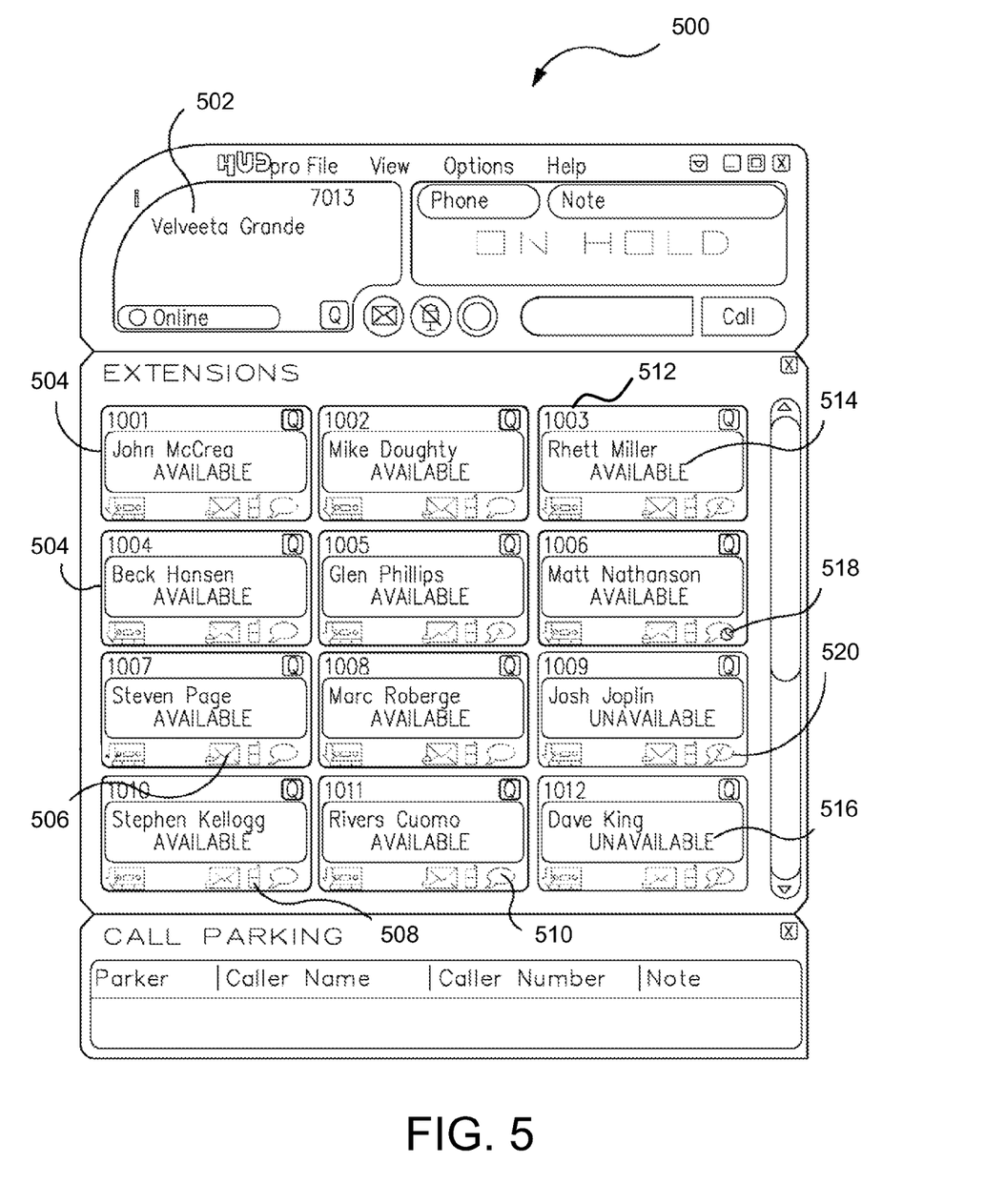
FIG. 5 is an example of a communication interface for enabling single click enterprise communication.

Referring now to FIG. 5, an example of a user interface 500 configured to provide single click enterprise communication is provided. The exemplary user interface 500 displays individuals within the enterprise with which a present user associated with the user interface 500 may establish communications using embodiments of the present invention. In the present example, the user (i.e., individual using the user interface 500) is identified by name and extension in a top, left display section 502. Local and remote individuals of the enterprise are displayed in a lower portion of the user interface 500, and may be identified by name and extension within a display block 504. The local and remote individuals may be organized in any manner, such as by first name, last name, extension number, team (e.g., sales teams, executive team) or group, and so forth.

It should be noted that any number of individuals within the enterprise may be provided on the user interface 500, and not all individuals within the enterprise may be listed. For example, the user may select individuals the user communicates the most with for their user interface 500. In another example, select groups of individuals (e.g., sales group, IT group) may be provided on the user interface 500.

Within each block 504, a plurality of icons may be provided to indicate availability and provide the single-click communication functionality. The icons may comprise, for example, an e-mail icon 506, a cellular/mobile phone icon 508, and a chat icon 510. Thus, a single-click selection of an e-mail icon 506 associated with Steve Page will initiate an e-mail (e.g., bring up an e-mail composition window) to Steve Page whereby a corresponding e-mail contact identifier (e.g., steve.page@company.com) may be automatically provided in an address field. In a further example, a single-click selection of the cellular phone icon 508 for Stephen Kellogg will initiate a call to Stephen's cellular phone whereby the contact identifier is Stephen's cellular phone number. Additionally, a single-click selection of the chat icon 510 will initiate a chat session (e.g., open up a chat window) with Rivers Cuomo in the example of FIG. 5.

In yet further embodiments, a phone call may be initiated using the single-click communication functionality with any individual listed in the blocks 504. In one embodiment, the user may initiate the phone call by clicking on an extension number 512 within the block 504 or by clicking on the individual's name within the block 504. In yet other embodiments, a phone icon (not shown) may be provided within the block 504.

A direct-to-voicemail functionality may also be provided via the user interface 500. In one embodiment, a voicemail icon may be displayed in the block 504. Alternatively, the single click selection of the individual's name or extension number may activate a voicemail call. In these embodiments, differentiation is provided between a phone call and a voicemail call. For example, a single click selection of the extension number may provide the voicemail call, while a single-click of the name will provide the phone call, or vice-versa.

With respect to availability of an individual for a phone call, telephone status may be provided within the block 504. For example, an "available" message 514 may be displayed in the block 504 when the individual is available to receive the phone call while an "unavailable" message 516 may be provided otherwise. In some embodiments, the block 504 may also be color-coded to indicate availability. For example, the block 504 may be colored blue if the individual is available for telephone communications and colored gray if unavailable.

With respect to instant messaging or chat, the status and availability of an individual for chat may also be displayed within the block 504. For example, the white chat icon 510 may indicate that the individual is available for chat. Thus, when the user selects the chat icon 510, a chat session will start with the indicated individual. A chat/clock icon 518 may indicate that the individual is away. For example, the user is logged in, but may not be currently using their client device 208. Finally, an "X"ed out chat icon 520 may indicate that the user is not available for chat. It should be noted that similar clock icons and "X"ed out icons may be utilized to indicate availability for other communication types, such as phone calls, cellular calls, and e-mails.

Figure 6:
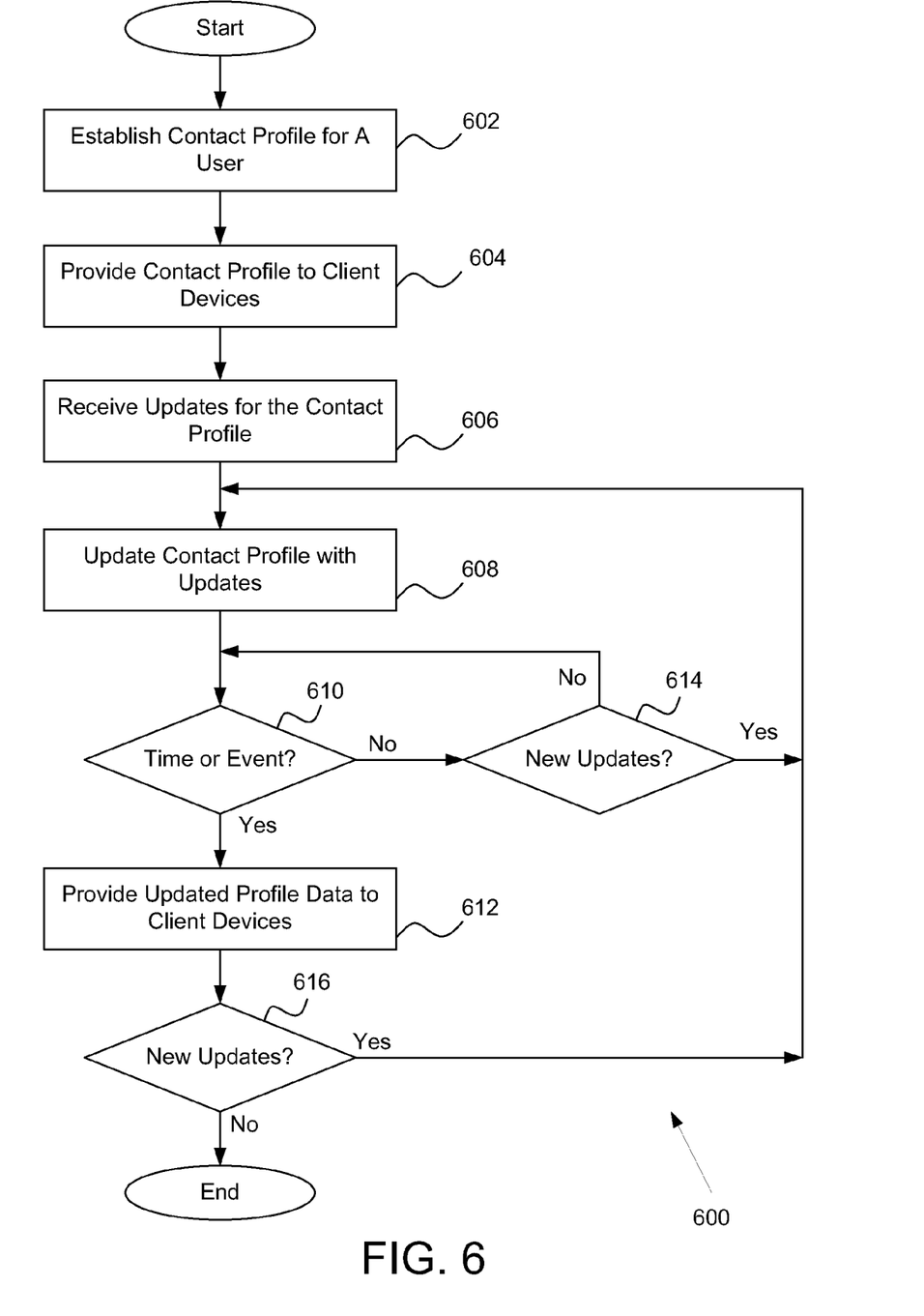
FIG. 6 is a flowchart of an exemplary method for maintaining profiles.

Referring now to FIG. 6, a flowchart 600 of an exemplary method for maintaining a profile is shown. Each profile is associated with an individual of the enterprise. In exemplary embodiments, the profile will comprise a list of one or more communication types available for the individual along with one or more contact identifiers for each communication type. Thus, for an e-mail communication type, the contact identifier may comprise one or more e-mail addresses for the individual. Similarly for a telephone communication type, the contact identifier may comprise one or more phone numbers or extensions for the individual.

In step 602, a profile is established for an individual. In some embodiments, the profile may be automatically generated for each individual and may be pre-populated with known contact identifiers. For example, the individual's extension number and/or standard e-mail address (e.g., name@company.com) may be known and used to pre-populate fields of the profile. The individual or an administrator may then provide any missing contact identifiers. In other embodiments, the individual or an administrator may input all the contact identifiers for different communication types associated with the individual in order to generate the profile. The profile is then stored at the HUD server 206.

In step 604, the profile is provided to the client devices 112 and 208. In some embodiments, profiles stored in the server profile database 308 are pushed to the client devices 112 and 208. The profiles may be provided at any time or based on an occurrence of any event. In other embodiments, the client devices 112 and 208 may ping the HUD server 206 for the profiles. For example, upon startup, the client device 208 may send a request for the profiles.

In various embodiments, updates may be made to one or more of the profiles. Accordingly, new data, such as contact identifiers may be received in step 606. For example, an individual may change their cellular phone number. The new contact identifiers are then be used to update the profile. It should be noted that data other than new contact identifiers may be received and stored in steps 606 and 608.

In step 610, a determination is made as to whether a pre-determine amount of time has passed or an event occurred that will trigger an update to profiles stored at the client devices 112 and 208. The event triggers may comprise, for example, startup of the client device 112 or 208 or new updates to the profiles. If the time or event trigger is positive, then the update profile(s) or the updated profile portions (e.g., the new contact identifiers) are provided to the client devices 112 and 208 in step 612. If the time or event trigger is negative, a determination is made as to whether new updates are received in step 614. If new updates are received, the method returns to step 608. Conversely, if no new updates are received, the method returns to step 610.

After the updated profile data is provided to the client devices in step 612, a determination is made as to whether new updates are received in step 616. If new updates are received, the method returns to step 608. If new updates are not received, the method may end. Alternatively, the method may continue to check for new updates and provide the new updates to the client devices 112 and 208.

Figure 7:
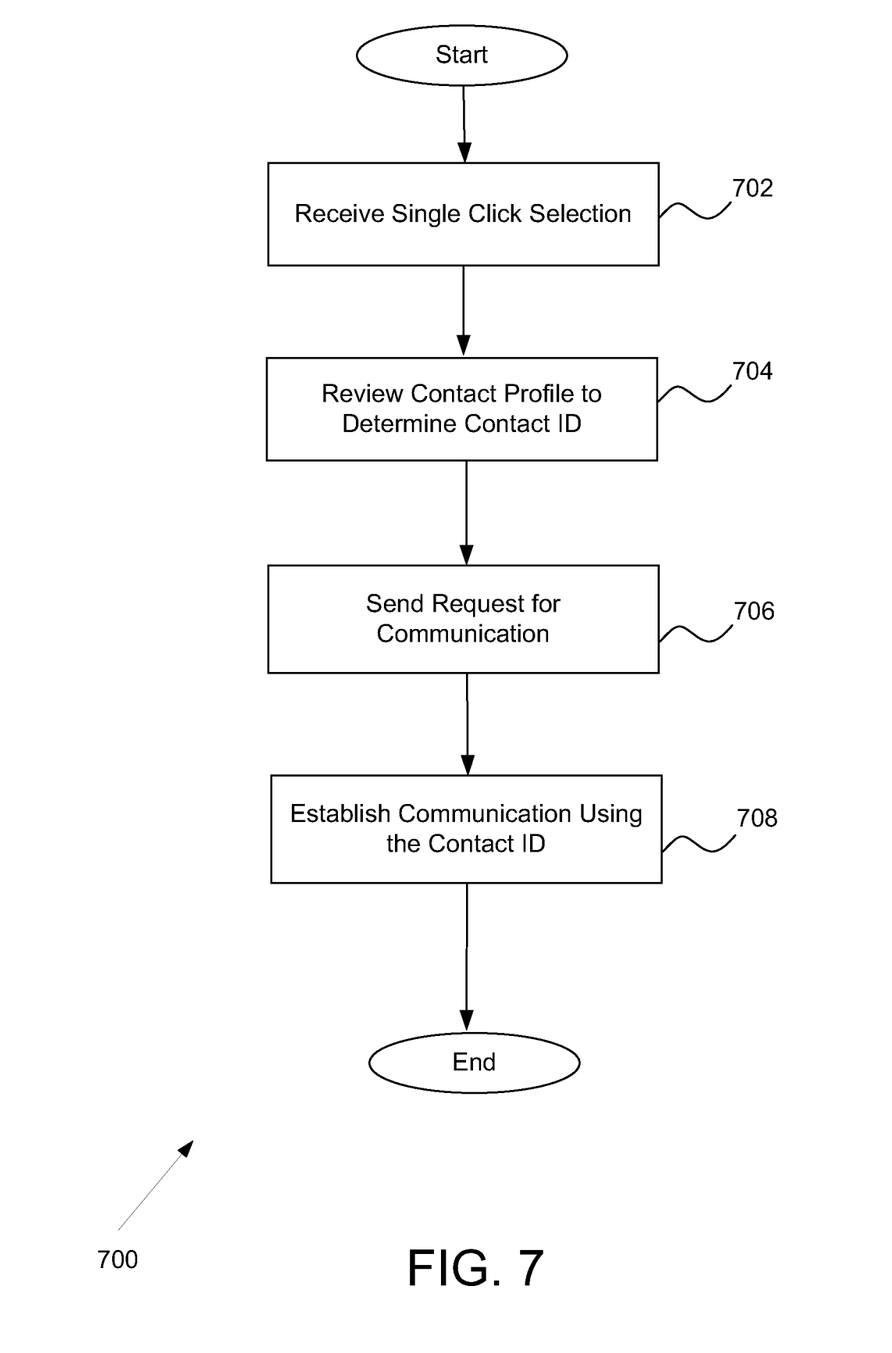
FIG. 7 is a flowchart of an exemplary method for providing single click enterprise communication.

Referring now to FIG. 7, an exemplary flowchart 700 of a method for providing single click enterprise communication is shown. In step 702 a single click selection is received. In exemplary embodiments, a user will select an icon associated with an individual that the user would like to establish communications with. The icons may comprise, for example, a cellular phone icon, chat icon, e-mail icon, phone icon (e.g., extension number or name), or SMS icon. The selected icon will indicate a communication type (e.g., phone call to a cellular phone, chat, e-mail, phone call to voicemail, phone call to analog phone, etc.) to use for establishing the communication. In one embodiment, the single click selection is received by the selection module 412.

A profile associated with the selected individual is reviewed in step 704 to determine an appropriate contact identifier. In exemplary embodiments, the profile lookup module 414 may review the profile stored in the client profile database 410. Thus, for example, if an e-mail icon was selected for Bob Smith, the profile lookup module 414 will review Bob Smith's profile to determine one or more e-mail addresses (i.e., contact identifier) for Bob Smith.

In step 706, a request for communication is sent to an appropriate module or server. In exemplary embodiments, the request will include the contact identifier(s) that were determined in step 704. For example, a request for a phone call to Bob Smith may be sent to the HUD server 206.

The communication is then established in step 708. Continuing with the example, the HUD server 206 will receive the request for the phone call to Bob Smith and instruct the PBX server 204 to establish the call using the determined contact identifier. Alternatively, an e-mail program of the client device 112 and 208 may initiate an e-mail composition window and pre-populate an address field with the contact identifier(s).

It should be noted that the methods of FIG. 6 and FIG. 7 are exemplary. Alternative embodiments may contemplate different steps, combination of steps, or different order to the steps.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A method for providing single click communication, comprising:
   providing access to a plurality of communication types on a single user interface at a client device of an enterprise, not all individuals within the enterprise being listed on the single user interface;
   receiving a single click selection of a communication type from the plurality of communication types for a particular individual;
   reviewing a profile associated with the individual to determine one or more contact identifiers associated with the selected communication type; and
   initiating the communication using the one or more contact identifiers.

2. The method of claim 1 further comprising generating the profile.

3. The method of claim 1 wherein the contact identifier comprises a direct-to-voicemail phone number for the individual.

4. The method of claim 1 wherein the contact identifier comprises an e-mail address.

5. The method of claim 1 wherein the contact identifier comprises a chat identifier.

6. The method of claim 1 wherein the contact identifier comprises an extension number.

7. The method of claim 1 wherein providing access to the plurality of communication types comprises providing icons associated with the communication types, whereby the single click selection may occur via selection of the icon.

8. The method of claim 1 further comprising receiving the one or more contact identifiers for the individual and updating the profile accordingly.

9. The method of claim 1 further comprising storing the profile in a database at a server level.

10. The method of claim 9 further comprising broadcasting data in the profile to client devices at a predetermined time.

11. The method of claim 9 further comprising broadcasting data in the profile to client devices when a change in the profile occurs.

12. The method of claim 9 further comprising sending data in the profile to client devices when pinged by the client devices.

13. The method of claim 9 further comprising sending data in the profile to the client devices upon start-up of the client devices.

14. The method of claim 1 further comprising providing communication status on the user interface.

15. A system for providing single click communication to a user, comprising:
   an interface module configured to provide a single user interface providing access to a plurality of communication types;
   a database configured to store profiles of individuals;
   a selection module configured to receive a single click selection of a communication type from the plurality of communication types for an individual;
   a profile lookup module configured to review a profile associated with the individual to determine a contact identifier associated with the selected communication type; and
   a communication request module configured to initiate the communication using the contact identifier.

16. The system of claim 15 further comprising a profile module configured to receive one or more contact identifiers for the individual and maintain the profile accordingly.

17. The system of claim 15 further comprising a data module configured to provide updates in one or more profiles to client devices.

18. The system of claim 15 further comprising a communication initiation module configured to send instructions to establish the communication.

19. The system of claim 15 wherein the user or individual are located remote from an enterprise central location.

20. A machine readable medium having embodied thereon a program, the program providing instructions for a method for providing single click communication, the method comprising:
   providing access to a plurality of communication types on a single user interface;
   receiving a single click selection of a direct-to-voicemail communication type from the plurality of communication types for a particular individual;
   reviewing a profile associated with the individual to determine one or more direct-to-voicemail contact identifiers associated with the selected communication type; and
   initiating the direct-to-voicemail communication using the one or more direct-to-voicemail contact identifiers.

* * * * *